United States Patent
Chiou et al.

(10) Patent No.: US 8,356,753 B2
(45) Date of Patent: Jan. 22, 2013

(54) METHOD FOR MULTI-TYPE BARCODE RECOGNITION, COMPUTER READABLE MEDIUM, AND BARCODE RECOGNITION APPARATUS

(75) Inventors: Hann-Huei Chiou, Taipei (TW); Yu-Jen Tu, Taipei (TW)

(73) Assignee: Getac Technology Corporation, Hsinchu (TW)

( * ) Notice: Subject to any disclaimer, the term of this patent is extended or adjusted under 35 U.S.C. 154(b) by 46 days.

(21) Appl. No.: 12/890,005

(22) Filed: Sep. 24, 2010

(65) Prior Publication Data
US 2011/0073651 A1 Mar. 31, 2011

(30) Foreign Application Priority Data
Sep. 25, 2009 (CN) .......................... 2009 1 0175755
Sep. 7, 2010 (CN) .......................... 2010 1 0286326

(51) Int. Cl.
*G06K 7/10* (2006.01)
(52) U.S. Cl. .......... 235/462.07; 235/462.01; 235/462.16
(58) Field of Classification Search .................. 235/435, 235/454, 462.08, 462.01, 462.07, 462.16
See application file for complete search history.

(56) References Cited

U.S. PATENT DOCUMENTS

| | | | | |
|---|---|---|---|---|
| 4,873,426 A * | 10/1989 | Sarna et al. | ................ | 235/462.1 |
| 5,329,105 A * | 7/1994 | Klancnik et al. | ......... | 235/462.16 |
| 5,414,252 A * | 5/1995 | Shinoda et al. | .......... | 235/462.07 |
| 5,457,309 A * | 10/1995 | Pelton | ....................... | 235/462.28 |
| 5,481,098 A * | 1/1996 | Davis et al. | .............. | 235/462.07 |
| 5,825,006 A * | 10/1998 | Longacre, Jr. et al. | .. | 235/462.27 |
| 5,932,862 A * | 8/1999 | Hussey et al. | ............ | 235/462.07 |
| 5,969,326 A * | 10/1999 | Ogami | ..................... | 235/462.27 |
| 6,095,422 A * | 8/2000 | Ogami | ..................... | 235/462.27 |
| 6,491,223 B1 * | 12/2002 | Longacre, Jr. et al. | .. | 235/462.01 |
| 6,585,157 B2 * | 7/2003 | Brandt et al. | ............ | 235/462.07 |
| 6,612,494 B1 * | 9/2003 | Outwater | ................. | 235/462.04 |
| 7,281,659 B2 * | 10/2007 | Page | ........................ | 235/462.07 |
| 8,033,470 B2 * | 10/2011 | Maeda et al. | ............ | 235/462.06 |
| 2002/0185536 A1 * | 12/2002 | Tsunobuchi et al. | ......... | 235/454 |

FOREIGN PATENT DOCUMENTS
TW 200841686 10/2008

* cited by examiner

*Primary Examiner* — Daniel Hess
*Assistant Examiner* — Paultep Savusdiphol (57) ABSTRACT

A method for multi-type barcode recognition is provided for recognizing a current barcode, so as to determine a barcode type of the current barcode among supported barcode types and the corresponding barcode information. In the method, a record table is loaded in advance for recording the matching frequency that each supported barcode type matches the barcode type of recognized barcodes. According to the matching frequency these supported barcode types are sorted in a recognizing sequence to be utilized to recognize the current barcode according to the recognizing sequence. Every time a current barcode is to be recognized, the supported barcode type utilized to recognize the current barcode is picked up according to the recognizing sequence, so as to determine the barcode type of the current barcode. The supported barcode type that most frequently matches the recognized barcode will be picked up at first, therefore, the barcode recognition efficiency is improved.

11 Claims, 7 Drawing Sheets

METHOD FOR MULTI-TYPE BARCODE RECOGNITION, COMPUTER READABLE MEDIUM, AND BARCODE RECOGNITION APPARATUS

This non-provisional application claims priority under 35 U.S.C. §119(a) on Patent Application Nos. 200910175755.4 and 201010286326.7 filed in China on Sep. 25, 2009 and Sep. 7, 2010, the entire contents of which are hereby incorporated by reference.

BACKGROUND OF THE INVENTION

1. Field of the Invention

The present invention relates to a barcode recognition method, and more particularly to a method for multi-type barcode recognition and the barcode recognition apparatus performing the method.

2. Related Art

Usually, a barcode recognition apparatus supports multi-type barcode recognition. In other words, if a barcode type of a barcode to be recognized is unknown, the barcode recognition apparatus can determine which of a plurality supported barcode types matches the barcode to be recognized, and then derives the barcode information of the barcode.

In a common multi-type barcode recognition method, every time the barcode recognition apparatus captures a barcode, the barcode recognition apparatus picks up each of the supported barcode types one by one and utilizes the corresponding barcode protocol to recognize the barcode, so as to determine the type of the barcode and derive the barcode information. Therefore, the more barcode types the barcode recognition apparatus supports, the larger number of times of performing the barcode comparison is required for recognizing a barcode. The barcode recognition efficiency is brought down and the recognition error rate is raised up.

To raise up the barcode recognition efficiency, one of the approaches is to determine the recognizing priorities of the supported barcode types in advance. Some of the barcode recognition apparatus provide function for a user to enable or disable the recognition of one or more barcode types, so as to raise up the barcode recognition efficiency and brought down the recognition error rate. However, not every user is familiar with barcode types. Sometimes the user may disable the function of supporting a common barcode type, and then barcode recognition apparatus will not be able to recognize the barcode. Therefore, the function for a user to enable or disable the recognition of one or more barcode types is not actually pragmatic and brings inconvenience to the user. In practice, except a simple circumstance, i.e., only a few barcode types are regularly utilized, the user will enable all the functions to support all the supported barcode types under most of the circumstances, so that the barcode recognition efficiency is brought down and the recognition error rate is raised up again.

SUMMARY OF THE INVENTION

When performing a multi-type barcode recognition method in the prior art, the barcode recognition efficiency is usually poor and the recognition error rate is usually high.

In view of the above problems, the present invention provides a method for multi-type barcode recognition, for recognizing a current barcode, so as to determine a barcode type of the current barcode among a plurality of supported barcode types and the corresponding barcode information carried by the current barcode.

The method comprises the following steps: loading a record table for recording a matching frequency that each supported barcode type matches the barcode type of recognized barcodes; sorting the supported barcode types in a recognizing sequence according to the matching frequency of each supported barcode type recorded in the record table and obtain a recognizing priority of each of the supported barcode type, wherein the supported barcode type having a relative high matching frequency has a relative high recognizing priority in the recognizing sequence; capturing the current barcode; picking up a supported barcode type one by one according to the recognizing sequence to recognize the current barcode, so as to determine the barcode type of the current barcode; updating the matching frequency of the supported barcode type that matches the barcode type of the current barcode according to a recognition result of the current barcode; and finally outputting a recognition result of the current barcode.

The present invention further provides a barcode recognition apparatus, for recognizing a current barcode, so as to determine a barcode type of the current barcode among a plurality of supported barcode types and the corresponding barcode information carried by the current barcode.

The barcode recognition apparatus comprises an image capturing module, a data storage device, and a control module. The image capturing module is provided for capturing the current barcode. The data storage device is provided for storing the current barcode captured by the image capturing module and a record table; wherein the record table is provided for recording matching frequencies that each supported barcode type matches the barcode type of recognized barcodes.

The control module sorts the supported barcode types in a recognizing sequence according to the matching frequency of each supported barcode type recorded in the record table, so as to obtain a recognizing priority of each of the supported barcode type; picks up a supported barcode type one by one according to the recognizing sequence to recognize the current barcode, so as to determine the barcode type of the current barcode.

In the method of multi-type barcode recognition and the barcode recognition apparatus of the present invention, the matching frequency that each supported barcode type matches the barcode type of recognized barcodes is recorded, so as to determine the recognizing priorities of the supported barcode types. The supported barcode type that most frequently matches the recognized barcode will be picked up to recognize the current barcode in advance, so as to reduce the number of the supported barcode types that actually utilized to recognize the current barcode. Therefore, the barcode recognition efficiency is raised up and the recognition error rate is brought down. That is, it is not necessary for a user to determine whether to enable or disable the functions of recognizing one or more barcode types, and the operation of a barcode recognition apparatus becomes more convenient.

The technical schemes and embodiments of the present invention are illustrated in detail below with reference to the accompanying drawings, and the contents are sufficient for persons skilled in the art to understand the technical contents of the present invention and implement the present invention accordingly.

BRIEF DESCRIPTION OF THE DRAWINGS

The present invention will become more fully understood from the detailed description given herein below for illustration only and thus not limitative of the present invention, wherein.

DETAILED DESCRIPTION OF THE INVENTION

Figure 1:
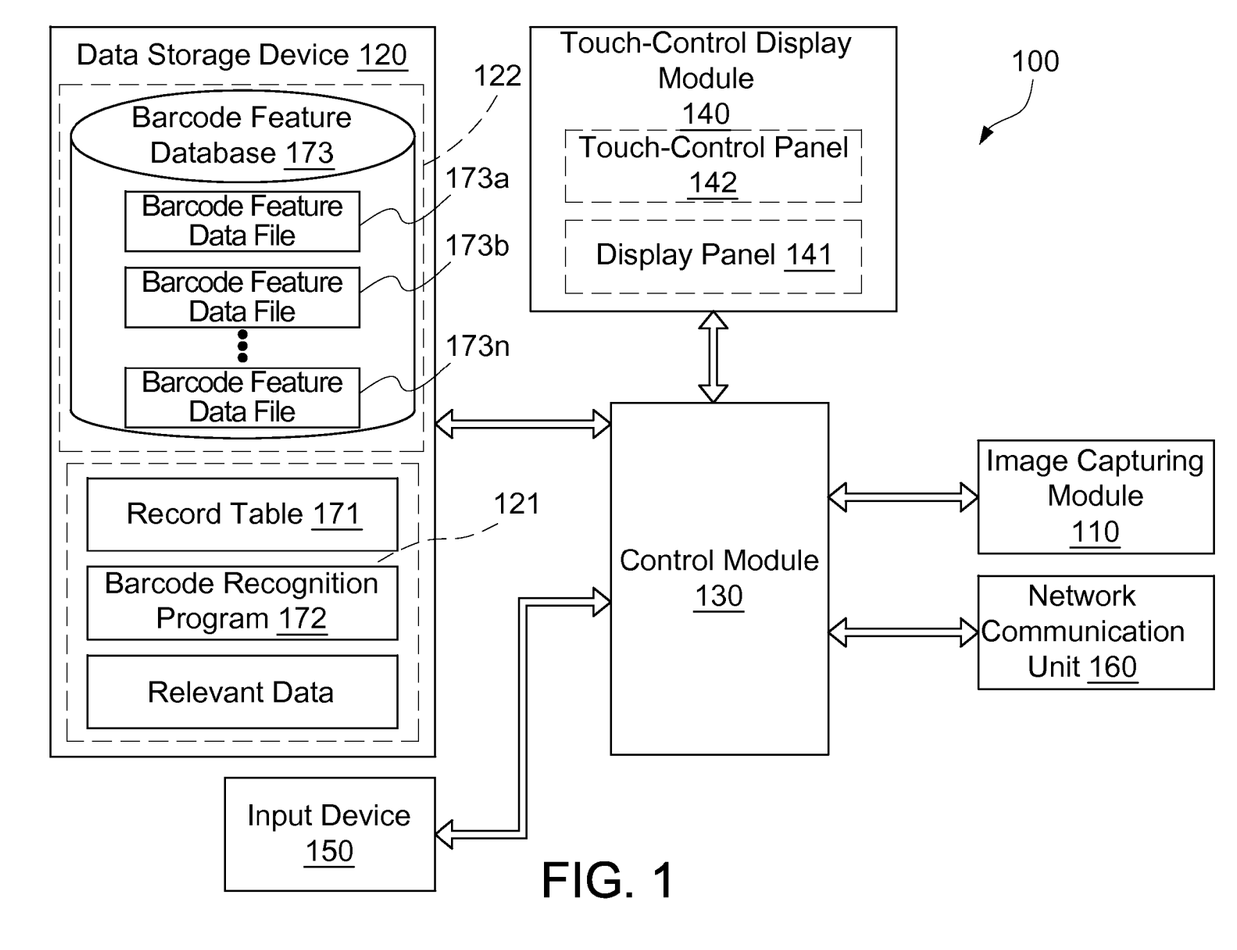
FIG. 1 is a circuit block diagram of a barcode recognition apparatus according to an example of the present invention.

Please refer to FIG. 1, a circuit block diagram of a barcode recognition apparatus 100 is provided according to an example of the present invention, for performing the method for multi-type barcode recognition of the present invention, so as to determine a barcode type of a current barcode among a plurality of supported barcode types and the corresponding barcode information carried by the current barcode.

The barcode recognition apparatus 100 may be a handheld data processing apparatus having functions of image capturing and programs executing, for example, a PDA (personal digital assistant), a PND (portable navigation device) or a Smart Phone. And the barcode recognition apparatus 100 is not limited to the handheld data processing apparatus, the barcode recognition apparatus 100 may also be a desktop computer or a laptop computer.

The barcode recognition apparatus 100 according to the example of the present invention takes a handheld data processing device as an illustration. The barcode recognition apparatus 100 comprises an image capturing module 110, a data storage device 120, a control module 130, a touch-control display module 140, an input device 150, and a network communication unit 160.

As shown in FIG. 1, the image capturing module 110 is provided for capturing a current barcode. The image capturing module 110 is a cam/camera which utilizes a complementary metal oxide semiconductor (CMOS) or a charge coupled device (CCD), and is preferably a cam/camera having high resolution capability (for example, a resolution capability of more than one Mega pixels) and an autofocus function for capturing images clearly.

The data storage device 120 provided for storing the current barcode captured by the image capturing module 110, a record table 171, a barcode recognition program 172, and a barcode feature database 173. The barcode feature database 173 includes a plurality of barcode feature data files 173a to 173n, and each of the barcode feature data files 173a to 173n corresponds to one of the supported barcode types. The record table 171 is provided for recording matching frequencies that each supported barcode type matches the barcode type of recognized barcodes.

The data storage device 120 also stores relevant data generated during the barcode recognition.

The specification of the data storage device 120 varies according to different types of the barcode recognition apparatus 100, and the data storage device 120 substantially includes a program memory 121 and a storage memory 122. The program memory 121 and the storage memory 122 can be two separated storage modules. The data storage device 120 can be a single storage module, which is divided into two different storage partitions, namely a program memory 121 and a storage memory 122 after being partitioned. Taking a handheld data processing device as an illustration, the program memory 121 is usually a random access memory for storing an operating system and important resident program, and serves as a space for the handheld data processing device to load and execute programs. The storage memory 122 is a built-in or external NAND Flash memory module for storing general data or non-resident general program files.

The handheld data processing device is taken as an illustration in the example of the present invention. If the barcode recognition apparatus 100 is a common personal computer, the program memory 121 and the storage memory 122 can be respectively a system memory and a hard disk, and the operating system and important resident programs are installed and stored in the hard disk serving as the storage memory 122.

The control module 130 includes a CPU, a system logic chipset, and a display interface. The control module 130 is provided for processing digital data. The CPU and system logic chipset can be multiple electronic components independently disposed on a circuit board, or the CPU and the system logic chipset can be integrated into a system-on-a-chip (SoC). The control module 130 applied in the handheld data processing device is usually a system SoC.

The image capturing module 110 is electrically connected to the control module 130, such that the image capturing module 110 is controlled by the control module 130 to capture the current barcode and send the current barcode to the control module 130. The data storage device 120 is also electrically connected to the control module 130, such that the control module 130 accesses data from the data storage device 120. The control module 130 loads and executes a barcode recognition program 172 from the data storage device 120 to control the image capturing module 110 to capture the current barcode and send the current barcode to the control module 130.

The touch-control display module 140 receives the display signals generated by the control module 130 through the display interface to display image frames, and the touch-control display module 140 is touched to generate an operation instruction to the control module 130.

The touch control display module 140 includes a display panel 141 and a touch-control panel 142 disposed on the display panel 141. The display panel 141 receives the display signals of the control module 130 to display the image frames. The touch-control panel 142 is combined with the display panel 141 and provided for being touched by the user to generate a corresponding operation instruction to the control module 130.

The input device 150 is electrically connected to the control module 130 for generating the operation instruction to the control module 130, and the input device 150 can be a key, a navigation button, a computer mouse or a combination thereof. The network communication unit 160 is connected to the control module 130 for connection to an external network.

Figure 2:
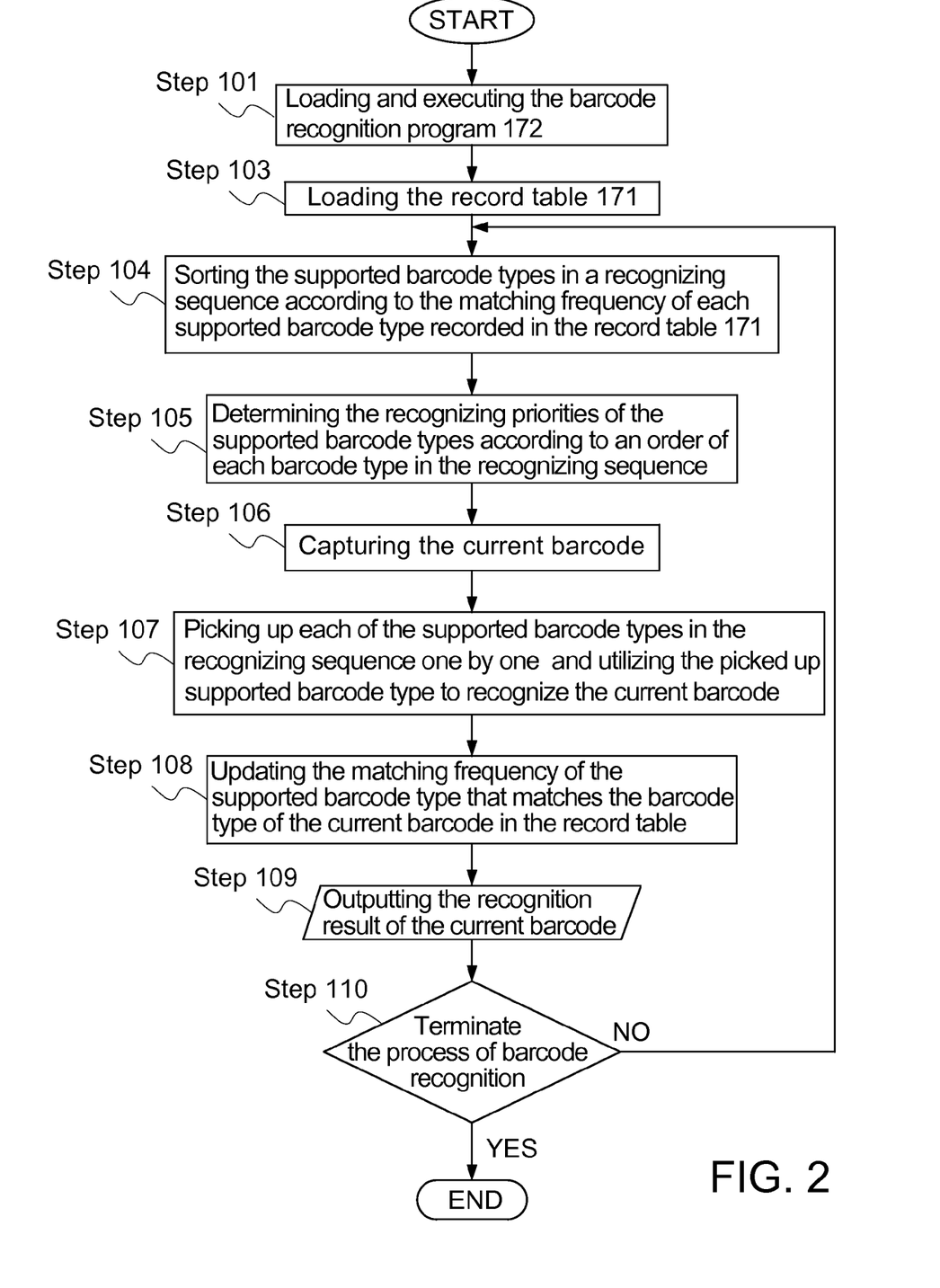
FIG. 2 is a flowchart of a method for multi-type barcode recognition according to a first embodiment of the present invention.

FIG. 1 and FIG. 2 show a method for multi-type barcode recognition performed by the barcode recognition apparatus 100 according to a first embodiment of the present invention.

At first, as in Step 101, the control module 130 of the barcode recognition apparatus 100 loads and executes the barcode recognition program 172 from the data storage device 120, and controls the image capturing module 110 to capture the current barcode and send the current barcode to the control module 130. The barcode recognition program 172 supports recognition of multi-type barcode, so as to make the barcode recognition apparatus 100 have capability of recognizing multi-type barcode.

Taking FIG. 1 as an illustration, each of the barcode feature data files 173a to 173n in the barcode feature database 173 is respectively provided corresponding to one of the supported barcode types. After obtaining the current barcode through the image capturing module 130, the control module 130 compares each of the barcode feature data file 173a to 173n with the barcode in a pre-determined sequence, so as to determine the barcode type of the current barcode and derive the barcode information of the current barcode according to the barcode protocol of the determined barcode type.

In Step 103, before performing barcode recognition, the control module 130 loads the record table 171 from the data storage device 120.

In Step 104, according to the matching frequency of each supported barcode type recorded in the record table 171, the control module 130 sorts the supported barcode types in a recognizing sequence to obtain a recognizing priority of each of the supported barcode type; wherein a supported barcode type having a relative high matching frequency has a relative high recognizing priority in the recognizing sequence.

In Step 105, the control module 130 determines the recognizing priorities of the supported barcode types according to an order of each barcode type in the recognizing sequence.

In Step 106, after the user confirms that the image capturing module 110 is aligned with the current barcode to be recognized, he/her can uses the input device 150 or the touch-control display module 140 to send the operation instruction to the control module 130, such that the control module 130 drives the image capturing module 110 to capture the current barcode and to send the current barcode to the control module 130.

In Step 107, the control module 130 of the barcode recognition apparatus 100 picks up each of the supported barcode types in the recognizing sequence one by one according to the recognizing priorities of the supported barcode types and utilizes the picked up supported barcode type to recognize the current barcode, so as to determine the barcode type of the current barcode.

In Step 108 and Step 109, according to a recognition result of the current barcode, the control module 130 of the barcode recognition apparatus 100 updates the matching frequency of the supported barcode type that matches the barcode type of the current barcode in the record table, and then outputs the recognition result of the current barcode.

In Step 110, After the recognition of a barcode is completed and the recognition result is obtained, the control module 130 of the barcode recognition apparatus 100 displays the inquiry message through the display panel 141 to confirm whether to terminates the process of barcode recognition. If the user determines not to terminate the process of barcode recognition through the input device 150 or the touch-control panel 142, the control module 130 returns to Step 140, that is, the control module 130 updates the recognizing priorities of the supported barcode types according to the updated record table 171, and performs the barcode recognition process from Step 105 to Step 110.

Through above-mentioned method of barcode recognition, a supported barcode type having a relative high matching frequency has a relative high recognizing priority, compared with the other supported barcode types in the recognizing sequence. Therefore, this supported barcode type having a relative high matching frequency is utilized to recognize the current barcode before the other supported barcode types are utilized. It is predictable that a supported barcode type having a high recognizing priority has high probability to match the barcode type of the current barcode. Since the supported barcode type having a high recognizing priority is utilized to recognize the current barcode prior to the other supported barcode types, the barcode recognition process is effectively accelerated.

The flowchart in FIG. 2 is brought based on the assumption that the record table 171 already exists in the data storage device 120. However, if it is the first time that the barcode recognition apparatus 100 executes the barcode recognition program 172, or if the barcode recognition program 172 is reset by the user to delete the record table 171, the record table 171 will not exists in the data storage device 120. In practice, the method for multi-type barcode recognition has to be modified to handle the circumstance that the record table 171 does not exist.

Figure 3A:
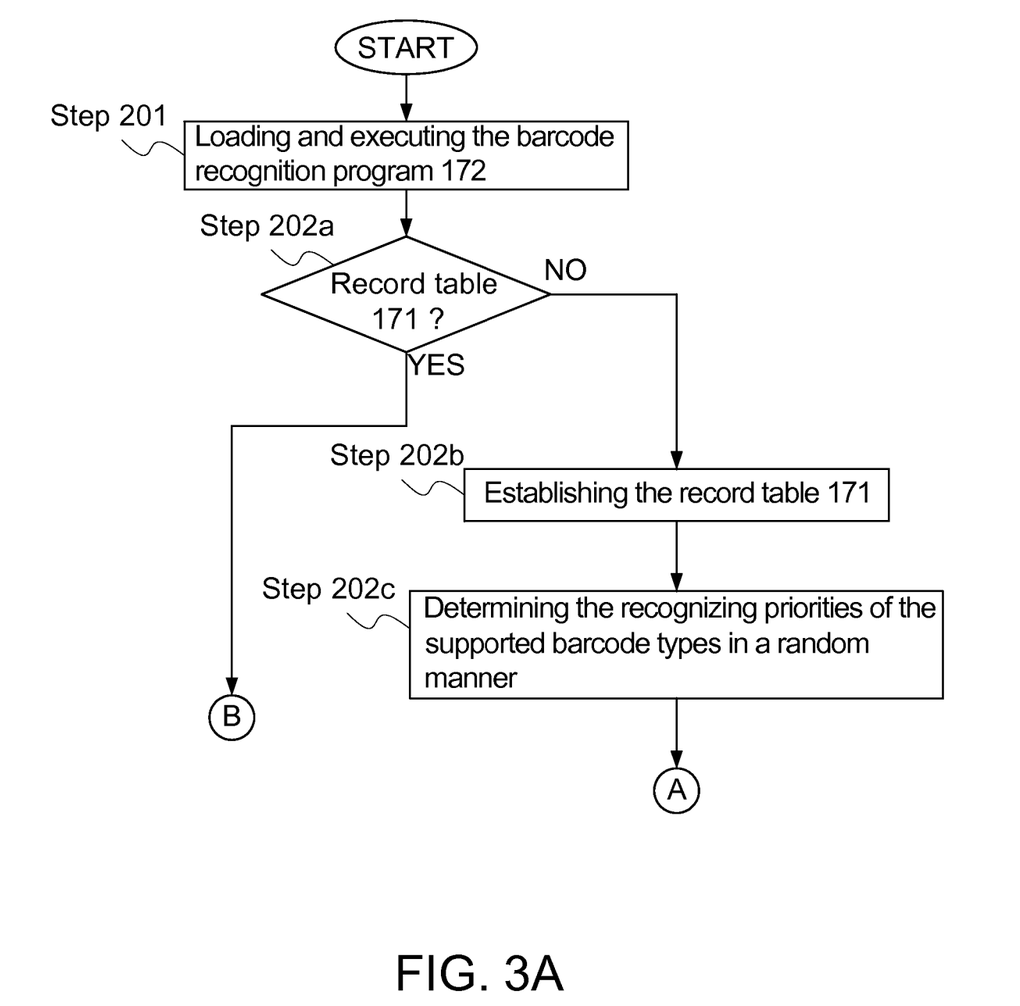
FIGS. 3A and 3B are flowcharts of a method for multi-type barcode recognition according to a second embodiment of the present invention.
Figure 3B:
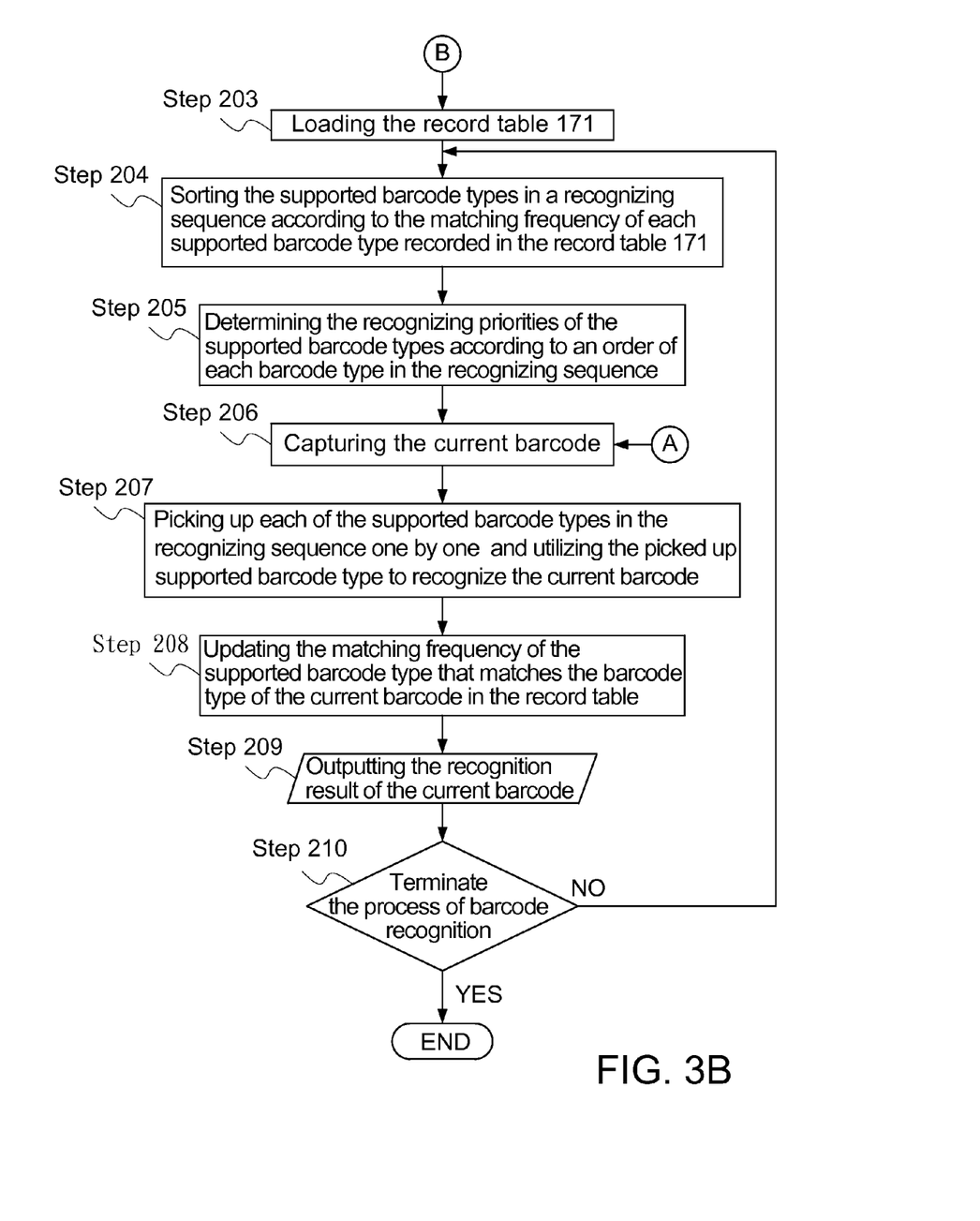

Please refer to FIGS. 1, 3A, 3B. A method for multi-type barcode recognition performed by the barcode recognition apparatus 100 according to a second embodiment of the present invention is provided.

At first, as in Step 201, the control module 130 of the barcode recognition apparatus 100 loads and executes the barcode recognition program 172 from the data storage device 120.

In Step 202a, the control module 130 of the barcode recognition apparatus 100 verifies whether the record table 171 exists in the data storage device 120.

In Step 202b, if the record table 171 does not exist in the data storage device 120, the control module 130 establishes the record table 171, sets the matching frequency of each supported barcode types recorded in the record table 171 to zero, and then stores the record table 171 in the data storage device 120.

In Step 202c, since the matching frequencies of supported barcode types in the newly established record table 171 are zero, it is impossible to determine the recognizing priorities of the supported barcode types. Therefore, the control module 130 determines the recognizing priorities of the supported barcode types in a random manner.

Then the control module performs Step 206 directly to drive the image capturing module 110 to capture the current barcode and to generate the current barcode to the control module 130. Then the control module 130 performs Step 207 to Step 210. Step 207 to Step 210 is approximately the same as Step 107 to 110, and will not be described again.

In Step 202a, if the record table 171 already exists in the data storage device 120, the control module 130 directly performs Step 203 to load the record table 171 from the data storage device 120. Then the control module 130 performs Step 203 to Step 210. Step 203 to Step 210 is approximately the same as Step 103 to Step 110 in the first embodiment, and will not be described here again.

In second embodiment, the barcode recognition apparatus 100 verifies whether the record 171 exists before performing barcode recognition, and then performs the corresponding step according to the verification result.

Please refer to FIGS. 1, 4A, 4B, and 4C. A method for multi-type barcode recognition performed by the barcode recognition apparatus 100 according to a third embodiment of the present invention is provided.

Figure 4A:
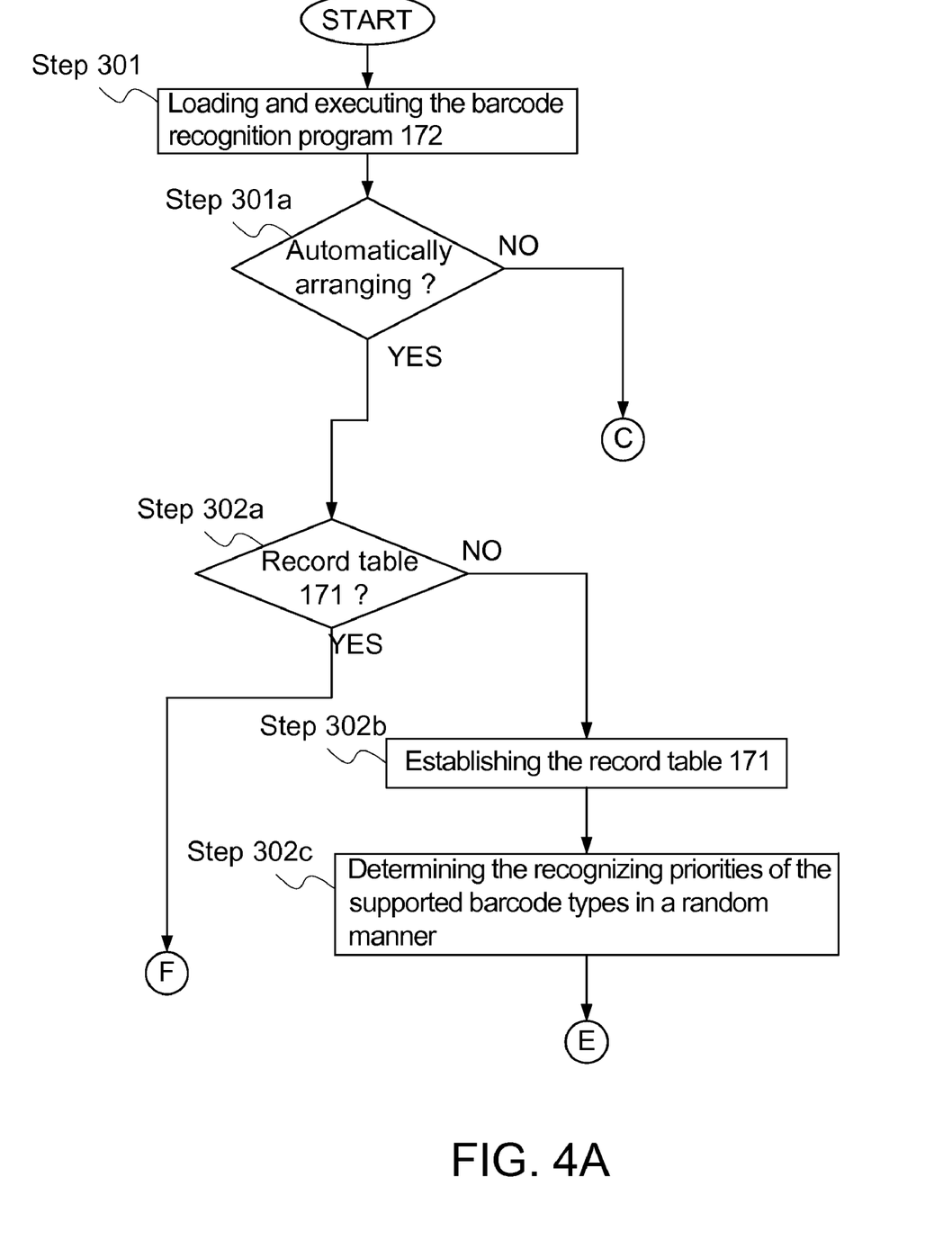
FIGS. 4A, 4B, and 4C are flowcharts of a method for multi-type barcode recognition according to a third embodiment of the present invention.
Figure 4B:
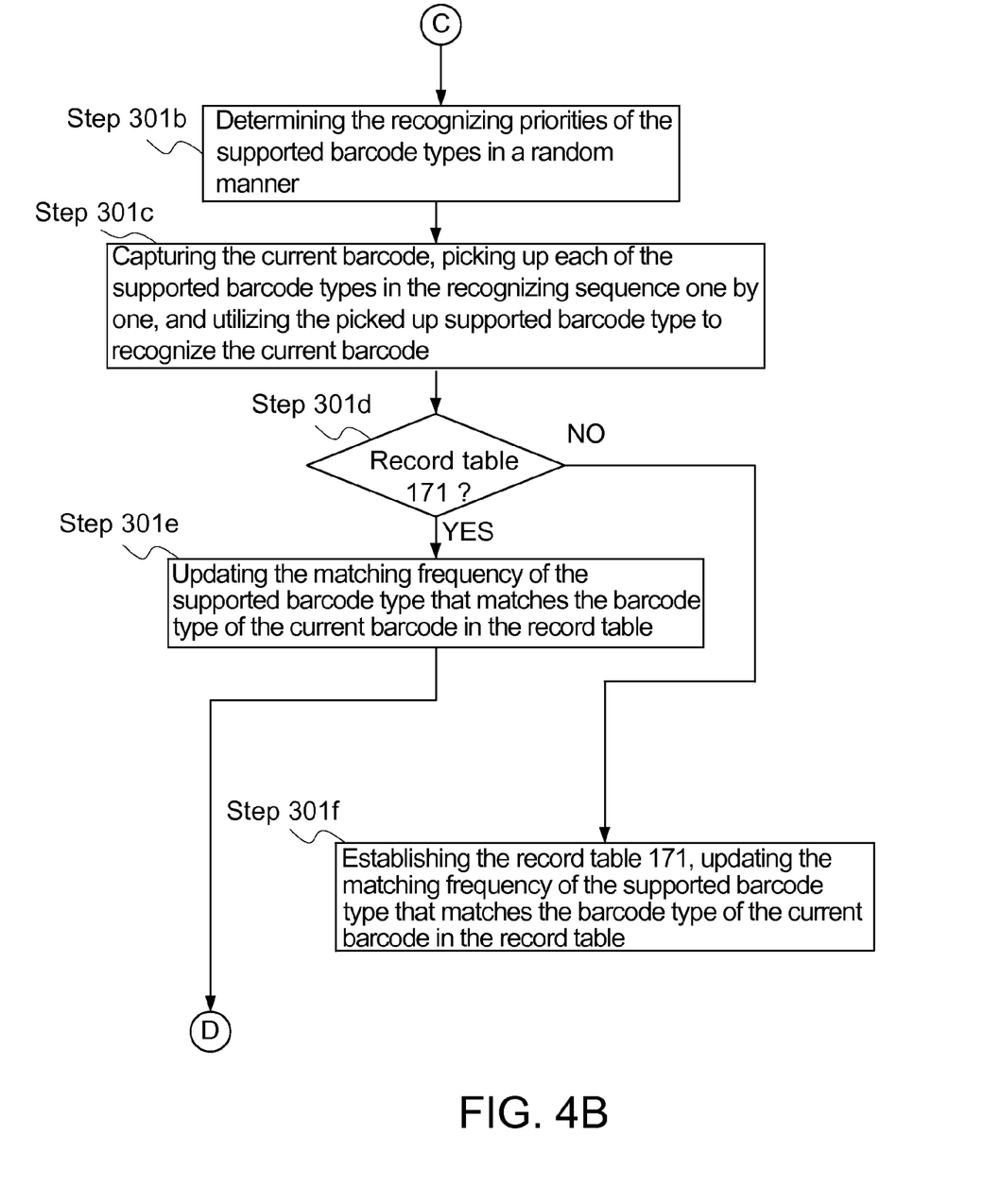
Figure 4C:
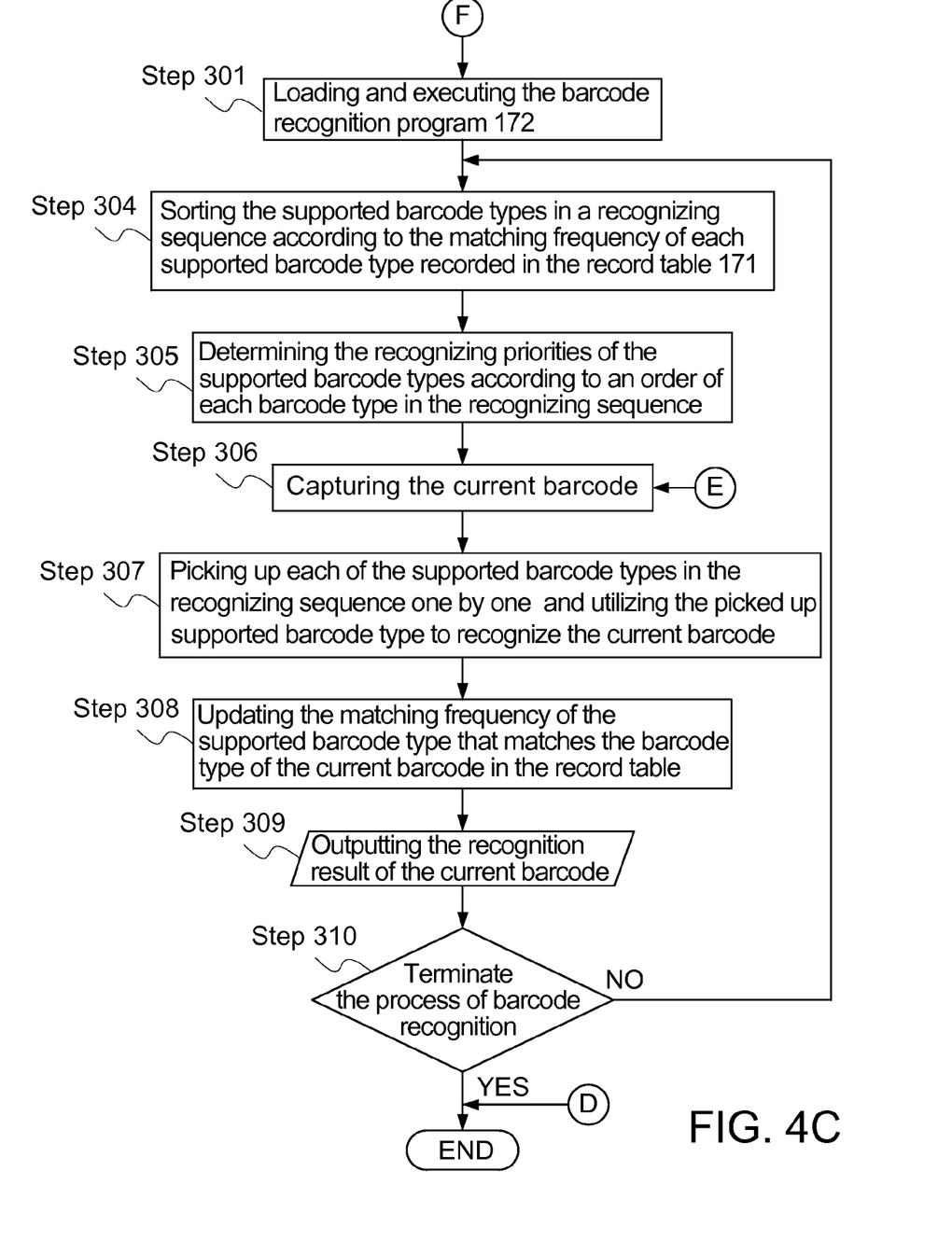

The method for multi-type barcode recognition of the third embodiment additionally provides an option to enable or disable the function of automatically arranging recognizing priorities of the supported barcode types, for the user to determine whether to utilize the recognizing priorities of the supported barcode types in the record table for performing multi-type barcode recognition.

At first, as in Step 301, the control module 130 of the barcode recognition apparatus 100 loads and executes the barcode recognition program 172 from the data storage device 120.

In Step 301a, the control module 130 of the barcode recognition apparatus 100 displays the inquiry message through the display panel 141 for the user to determine whether to enable or disable a function of automatically arranging recognizing priorities of the supported barcode types.

Please refer to FIGS. 4A and 4B. If the user utilizes the input device 150 or the touch-control display module 140 to disable the function of automatically arranging recognizing priorities of the supported barcode types, the control module 130 of the barcode recognition apparatus 100 performs Step 301b directly to determine the recognizing priorities of the supported barcode types in a random manner.

In Step 301c, the control module 130 drives the image capturing module 110 to capture the current barcode, picks up each of the supported barcode type in the recognizing sequence one by one according to the recognizing priorities of the supported barcode types, and utilizes the picked up supported barcode type to recognize the current barcode, so as to determine the barcode type of the current barcode.

Since the user determines to disable the function of automatically arranging recognizing priorities of the supported barcode types, the recognition result still can be utilized to update the matching frequencies of each of supported barcode types in the record table 171 under such circumstance. Therefore, the barcode recognition apparatus 100 updates the record table 171 after performing Step 301c.

The procedures of updating the record table 171 comprise the following steps.

In Step 301d, the control module 130 of the barcode recognition apparatus 100 verifies whether the record table 171 exists in the data storage device 120.

In Step 301e, if the record table 171 exists, the control module 130 of the barcode recognition apparatus 100 updates the matching frequency of the supported barcode type that matches the barcode type of the current barcode in the record table according to a recognition result of the current barcode, and then terminates the recognition process.

In Step 301f, if the record table 171 does not exist, the control module 130 establishes the record table 171 at first. And then the control module 130 of the barcode recognition apparatus 100 updates the matching frequency of the supported barcode type that matches the barcode type of the current barcode in the record table according to a recognition result of the current barcode, and terminates the recognition process.

Although the function of automatically arranging recognizing priorities is disabled in this barcode recognition process, the barcode recognition apparatus 100 keeps on updating the matching frequencies in the record table 171 for being utilized when enabling the function of automatically arranging recognizing priorities.

In Step 301a, if the user determines to enable the function of automatically arranging recognizing priorities of the supported barcode types, the control module 130 of the barcode recognition apparatus 100 verifies whether the record table 171 exists in the data storage device 120 as shown in Step 302a.

In Step 302a, if the control module 130 determines that the record table 171 does not exist in the data storage device 120 of the barcode recognition apparatus 100, the control module 130 keeps on performing Step 302b, Step 302c, Step 306 to Step 310. Step 302b, Step 302c, Step 306 to Step 310 are approximately the same as Step 202b, Step 202c, Step 206 to Step 210 in the second embodiment, and will not be described here again.

In Step 302a, if the control module 130 determines that the record table 171 exists in the data storage device 120 of the barcode recognition apparatus 100, the control module 130 keeps on performing Step 3 to Step 310. Step 3 to Step 310 is approximately the same as Step 203 to Step 210 in the second embodiment, and will not be described here again.

Additional advantages and modifications will readily occur to those proficient in the relevant fields. The invention in its broader aspects is therefore not limited to the specific details and representative embodiments shown and described herein. Accordingly, various modifications may be made without departing from the spirit or scope of the general inventive concept as defined by the appended claims and their equivalents.

What is claimed is:

1. A method for multi-type barcode recognition, for recognizing a current barcode, to determine a barcode type of the current barcode among a plurality of supported barcode types and the corresponding barcode information carried by the current barcode, and the method comprising the following steps:
   (a) loading a record table for recording matching frequencies that each supported barcode type matches the barcode type of recognized barcodes;
   (b) obtaining user input to determine whether to enable or disable automatic arrangement of recognizing priorities of the supported barcodes;
   (c) when the automatic arrangement is enabled, performing the steps of:
      (c-1) according to the matching frequency of each supported barcode type recorded in the record table, sorting the supported barcode types in an arranged recognizing sequence to obtain a recognizing priority of each of the supported barcode types, wherein the supported barcode type having a relative high matching frequency has a relative high recognizing priority in the arranged recognizing sequence;
      (c-2) capturing the current barcode, picking up each of the supported barcode types in the arranged recognizing sequence one by one, and utilizing the picked up supported barcode type to recognize the current barcode, so as to determine the type of the current barcode;
      (c-3) according to a recognition result of the current barcode, updating the matching frequency of the supported barcode type that matches the barcode type of the current barcode; and
      (c-4) outputting a recognition result of the current barcode; and
   (d) when the automatic arrangement is disabled, performing the steps of:
      (d-1) determining the recognizing priorities of the supported barcode types in a random manner to obtain a random recognizing sequence;
      (d-2) capturing the current barcode, picking up each of the supported barcode types in the random recognizing sequence one by one, and utilizing the picked up supported barcode type to recognize the current barcode, so as to determine the type of the current barcode; and
      (d-3) according to a recognition result of the current barcode, updating the matching frequency of the supported barcode type that matches the barcode type of the current barcode.

2. The method as claimed in claim 1, wherein before the step (a) further comprising the following steps:
   verifying whether the record table exists; and
   establishing the record table if the record table does not exist, and setting the matching frequency of each supported barcode type recorded in the record table to zero.

3. The method as claimed in claim 1, wherein the steps of updating the record table comprises:
   verifying whether the record table exists; and
   establishing the record table if the record table does not exist, and updating the matching frequency of the supported barcode type that matches the barcode type of the current barcode according to the recognition result.

4. A computer readable medium, storing a barcode recognition program for a barcode recognition apparatus to read and then executing following steps to determine a barcode type of a current barcode among a plurality of supported barcode types and the corresponding barcode information carried by the current barcode, the steps comprising:
   (a) loading a record table for recording matching frequencies that each supported barcode type matches the barcode type of recognized barcodes;
   (b) obtaining user input to determine whether to enable or disable automatic arrangement of recognizing priorities of the supported barcodes
   (c) when the automatic arrangement is enabled, performing the steps of:
      (c-1) according to the matching frequency of each supported barcode type recorded in the record table, sorting the supported barcode types in an arranged recognizing sequence to obtain a recognizing priority of each of the supported barcode type, wherein the supported barcode type having a relative high matching frequency has a relative high recognizing priority in the arranged recognizing sequence;
      (c-2) capturing the current barcode, picking up each of the supported barcode type in the arranged recognizing sequence one by one, and utilizing the picked up supported barcode type to recognize the current barcode, so as to determine the barcode type of the current barcode;
      (c-3) updating the matching frequency of the supported barcode type that matches the barcode type of the current barcode according to a recognition result of the current barcode; and
      (c-4) outputting a recognition result of the current barcode; and
   (d) when the automatic arrangement is disabled, performing the steps of:
      (d-1) determining the recognizing priorities of the supported barcode types in a random manner to obtain a random recognizing sequence;
      (d-2) capturing the current barcode, picking up each of the supported barcode types in the random recognizing sequence one by one, and utilizing the picked up supported barcode type to recognize the current barcode, so as to determine the type of the current barcode; and
      (d-3) according to a recognition result of the current barcode, updating the matching frequency of the supported barcode type that matches the barcode type of the current barcode.

5. The computer readable medium as claimed in claim 4, wherein before the step (a) further comprising the following steps:
   verifying whether the record table exists; and
   establishing the record table if the record table does not exist, and setting the matching frequency of each supported barcode type recorded in the record table to zero.

6. The computer readable medium as claimed in claim 4, wherein the steps of updating the record table comprises:
   verifying whether the record table exists; and
   establishing the record table if the record table does not exist, and updating the matching frequency of the supported barcode type that matches the barcode type of the current barcode according to the recognition result.

7. A barcode recognition apparatus, for recognizing a barcode to determine a barcode type of a current barcode among a plurality of supported barcode types and the corresponding barcode information carried by the current barcode, the barcode recognition apparatus comprising:
   an image capturing module, for capturing the current barcode;
   a data storage device, for storing the current barcode captured by the image capturing module and a record table, and the record table recording matching frequencies that each supported barcode type matches the barcode type of recognized barcodes; and
   a control module configured to determine whether automatic arrangement of recognizing priorities of the supported barcodes is enabled or disable according to a user input, wherein the control module is further configured to:
      when then automatic arrangement is enabled, to sort the supported barcode types in an arranged recognizing sequence according to the matching frequency of each supported barcode type recorded in the record table to obtain a recognizing priority of each of the supported barcode type, to pick up each of the supported barcode type in the arranged recognizing sequence one by one, to utilize the picked up supported barcode type to recognize the current barcode and determine the barcode type of the current barcode, and to update the matching frequency of the supported barcode type that matches the barcode type of the current barcode; and
      when the automatic arrangement is disabled, to sort the supported barcode types in a random recognizing sequence to obtain a recognizing priority of each of the supported barcode type, to pick up each of the supported barcode type in the random recognizing sequence one by one, to utilize the picked up supported barcode type to recognize the current barcode and determine the barcode type of the current barcode, and to update the matching frequency of the supported barcode type that matches the barcode type of the current barcode.

8. The barcode recognition apparatus as claimed in claim 7, further comprising a touch-control display module, for receiving a display signal generated by the control module to display image frames, and for being touched to generate an operation instruction to the control module.

9. The barcode recognition apparatus as claimed in claim 8, wherein the touch-control display module comprising:
   a display panel, for displaying the image frames by receiving display signals of the control module; and
   a touch-control panel, combined with the display panel for being touched to generate the corresponding operation instruction to the control module.

10. The barcode recognition apparatus as claimed in claim 7, further comprising an input device, electrically connected to the control module, for sending an operation instruction to the control module.

11. The barcode recognition apparatus as claimed in claim 7, wherein the data storage device further stores a barcode feature database, the barcode feature database includes a plurality of barcode feature data files, and each of the barcode feature data file corresponds to one of the supported barcode types.

* * * * *